(12) United States Patent
Tang

(10) Patent No.: US 9,100,170 B2
(45) Date of Patent: Aug. 4, 2015

(54) FILE PACKING AND UNPACKING METHOD, AND DEVICE THEREOF

(71) Applicant: TENCENT TECHNOLOGY (SHENZHEN) COMPANY LIMITED, Shenzhen (CN)

(72) Inventor: Shengfu Tang, Shenzhen (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 0 days.

(21) Appl. No.: 14/367,198

(22) PCT Filed: Nov. 20, 2012

(86) PCT No.: PCT/CN2012/084867
§ 371 (c)(1),
(2) Date: Jun. 19, 2014

(87) PCT Pub. No.: WO2013/091452
PCT Pub. Date: Jun. 27, 2013

(65) Prior Publication Data
US 2015/0006891 A1    Jan. 1, 2015

(30) Foreign Application Priority Data
Dec. 23, 2011   (CN) .......................... 2011 1 0437932

(51) Int. Cl.
G06F 11/00 (2006.01)
H04L 9/06 (2006.01)
G06F 21/14 (2013.01)
G06F 21/52 (2013.01)
G06F 21/54 (2013.01)

(52) U.S. Cl.
CPC .............. *H04L 9/0643* (2013.01); *G06F 21/14* (2013.01); *G06F 21/52* (2013.01); *G06F 21/54* (2013.01); *G06F 2221/2107* (2013.01); *H04L 9/0618* (2013.01)

(58) Field of Classification Search
CPC ................ H04L 9/0643; H04L 9/0618; G06F 2221/2107
See application file for complete search history.

(56) References Cited

U.S. PATENT DOCUMENTS

2005/0091487 A1* 4/2005 Cross et al. .................. 713/165
2010/0268938 A1* 10/2010 Resch .......................... 713/153
2011/0225417 A1* 9/2011 Maharajh et al. ............ 713/150

FOREIGN PATENT DOCUMENTS

| CN | 102004884 A | 4/2011 |
|----|-------------|--------|
| CN | 102108512 A | 7/2011 |
| CN | 102184363 A | 9/2011 |

OTHER PUBLICATIONS

International Search Report issued Feb. 28, 2013 re: PCT/CN2012/084867; citing: CN 102108512 A, CN 102184363 A and CN 102004884 A.

* cited by examiner

Primary Examiner — Techane Gergiso
(74) Attorney, Agent, or Firm — Cantor Colburn LLP

(57) ABSTRACT

A file packing and unpacking method, the method including: encrypting a target file using an encryption/decryption algorithm to obtain an encrypted target file, dividing the encryption/decryption algorithm into a first part encryption/decryption algorithm and a second part encryption/decryption algorithm; obtaining a packed target file according to the first part encryption/decryption algorithm and the encrypted target file; and informing an unpacking apparatus of the packed target file and the second part encryption/decryption algorithm.

12 Claims, 6 Drawing Sheets

FILE PACKING AND UNPACKING METHOD, AND DEVICE THEREOF

CLAIM OF PRIORITY

This application is a U.S. National Phase application under 35 U.S.C. §371 of International Application No. PCT/CN2012/084867, filed Nov. 20, 2012, the entire contents of which are incorporated herein by reference.

FIELD OF THE DISCLOSURE

The present disclosure relates to telecommunications techniques, and more particularly, to a method and an apparatus for packing/unpacking a file.

BACKGROUND OF THE DISCLOSURE

FIG. 1 is a schematic diagram illustrating a principle of a conventional file packing and unpacking process. A target file is encrypted by an encryption/decryption algorithm to obtain an encrypted target file (i.e., the target file after being encrypted). Then, the encrypted target file is embedded into a packed target file (i.e., the target file after being packed). In addition, an algorithm key (secrete key) required by the encryption/decryption algorithm and the encryption/decryption algorithm are also embedded in the packed target file. The packing operation is to compress executable program resources. It is a frequently-used means for protecting a file. A program after being packed can be executed directly. But source codes of the program cannot be seen without an unpacking operation.

For a file unpacking procedure, after the packed target file is obtained, the encryption/decryption algorithm in the packed target file is executed automatically, so as to decrypt the encrypted target file in the packed target file and to obtain the original target file. The file unpacking process ends after the original target file is loaded.

SUMMARY OF THE DISCLOSURE

Examples of the present disclosure provide a file packing/unpacking method and apparatus, so as to increase a security level of a packing technique.

According to an example of the present disclosure, a file packing method is provided. The method includes:
 encrypting a target file using an encryption/decryption algorithm to obtain an encrypted target file, dividing the encryption/decryption algorithm into a first part encryption/decryption algorithm and a second part encryption/decryption algorithm;
 obtaining a packed target file according to the first part encryption/decryption algorithm and the encrypted target file; and
 informing an unpacking apparatus of the packed target file and the second part encryption/decryption algorithm.

According to another example of the present disclosure, a file unpacking method is provided. The method includes:
 receiving a packed target file and a second part encryption/decryption algorithm transmitted by a packing apparatus;
 obtaining a first part encryption/decryption algorithm and an encrypted target file from the packed target file;
 obtaining an encryption/decryption algorithm according to the first part encryption/decryption algorithm and the second part encryption/decryption algorithm; and
 decrypting the encrypted target file using the encryption/decryption algorithm to obtain a target file.

According to still another example of the present disclosure, a file packing apparatus is provided. The apparatus includes:
 a first obtaining module, adapted to encrypt a target file using an encryption/decryption algorithm to obtain an encrypted target file;
 a dividing module, adapted to divide the encryption/decryption algorithm into a first part encryption/decryption algorithm and a second part encryption/decryption algorithm;
 a second obtaining module, adapted to obtain a packed target file according to the first part encryption/decryption algorithm and the encrypted target file; and
 a transmitting module, adapted to transmit the packed target file and the second part encryption/decryption algorithm to an unpacking apparatus.

According to yet another example of the present disclosure, a file unpacking apparatus is provided. The apparatus includes:
 a receiving module, adapted to receive a packed target file and a second party encryption/decryption algorithm transmitted by a packing apparatus;
 a first obtaining module, adapted to obtain a first part encryption/decryption algorithm and an encrypted target file from the packed target file;
 a second obtaining module, adapted to obtain an encryption/decryption algorithm according to the first part encryption/decryption algorithm and the second part encryption/decryption algorithm; and
 a third obtaining module, adapted to obtain a target file through decrypting the encrypted target file using the encryption/decryption algorithm.

In examples of the present disclosure, the encryption/decryption algorithm is divided and only a part of the encryption/decryption algorithm is carried in the packed target file. Thus, the complete encryption/decryption algorithm is hard to be found and cracked and the security level of the packing technique is increased.

The above merely gives a brief description to the technical solution of the present disclosure. In order to make the technical solution and merits of the present disclosure clearer and may be implemented according to the description of the present disclosure, detailed description will be given in the following with reference to examples and accompanying drawings.

DETAILED DESCRIPTION OF THE DISCLOSURE

Hereinafter, the technical solution of the present disclosure will be described in further detail with reference to accompanying drawings and examples, so as to make the technical solution therein clearer. It should be noted that, the following described examples are merely some embodiments of the present disclosure but do not form all embodiments. Based on the following examples, those with ordinary skill in the art would have many variations without an inventive work, which are also within the protection scope of the present disclosure.

A First Example

Figure 1:
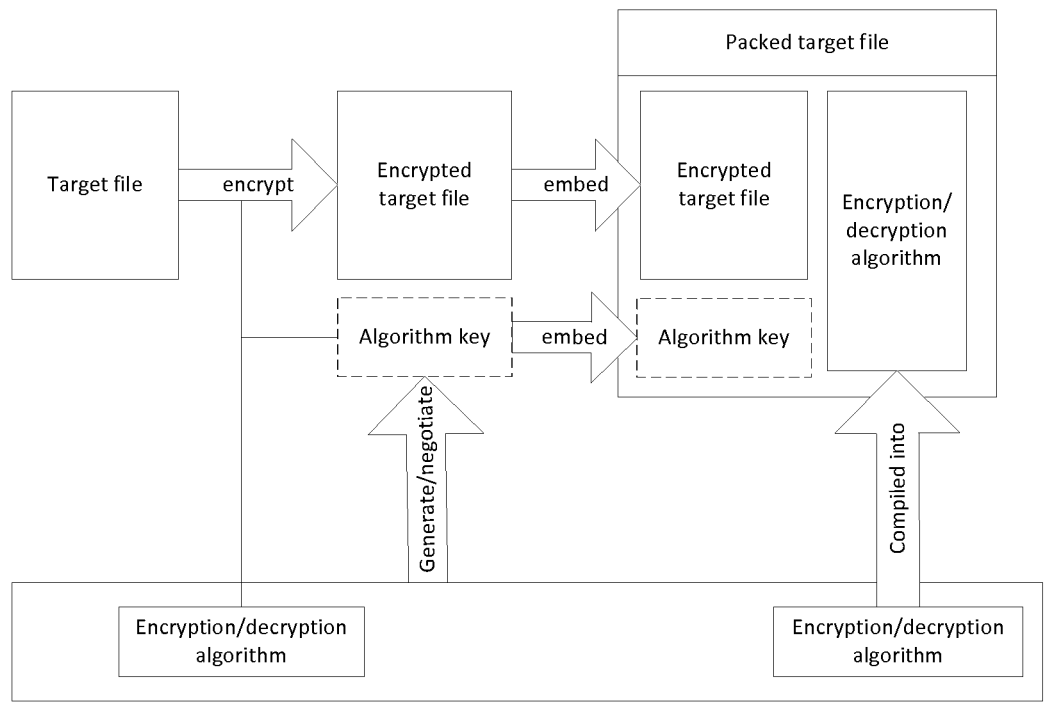
FIG. 1 is a schematic diagram illustrating a principle of a conventional file packing and unpacking technique.
Figure 2:
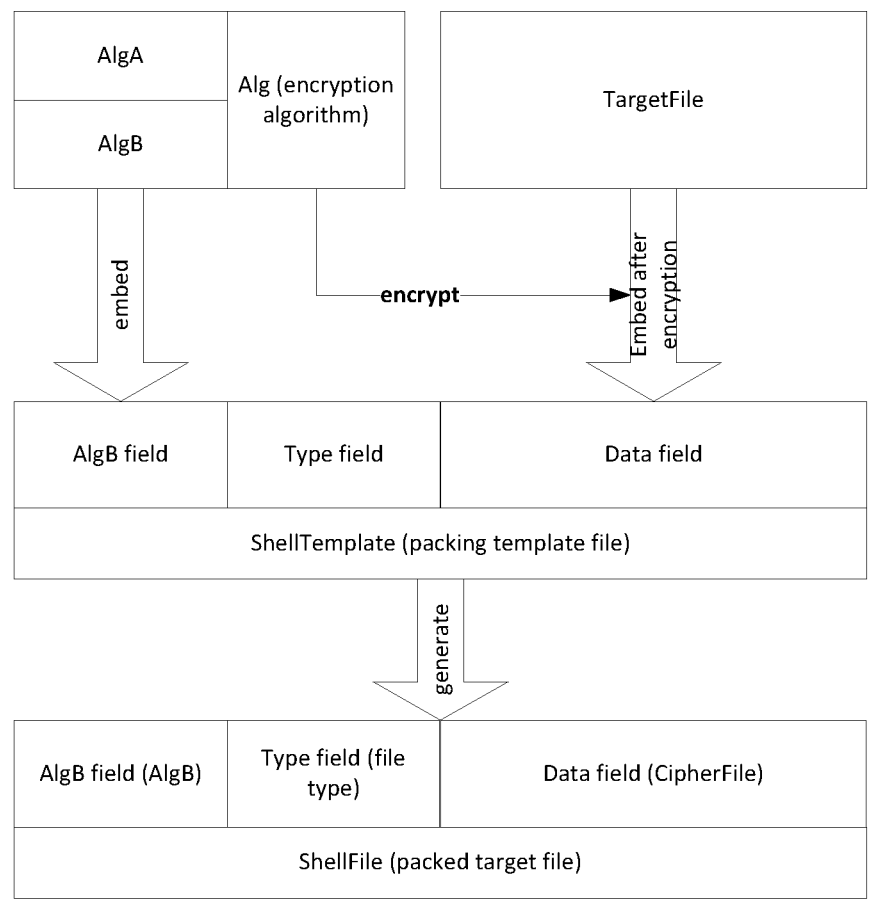
FIG. 2 is a schematic diagram illustrating a principle of a file packing process according to a first example of the present disclosure.
Figure 3:
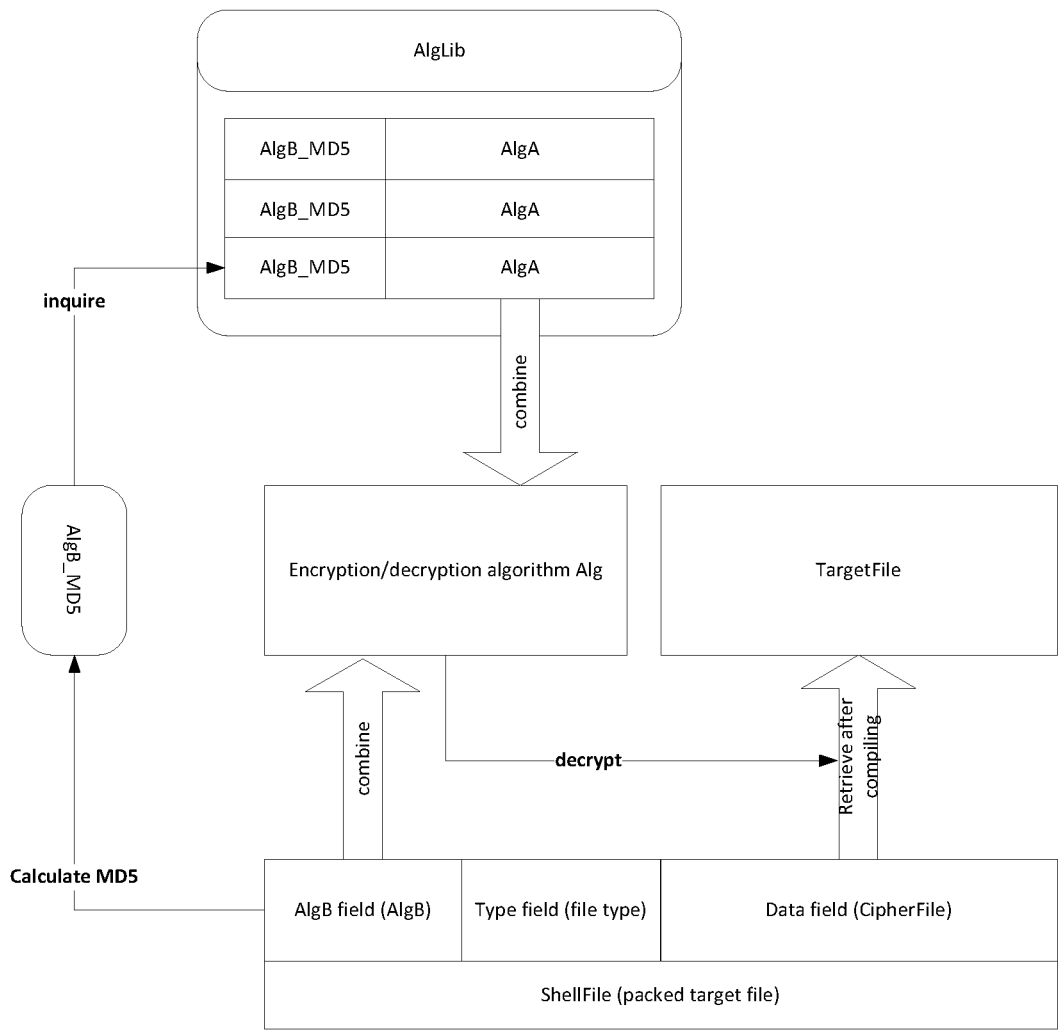
FIG. 3 is a schematic diagram illustrating a principle of a file unpacking process according to the first example of the present disclosure.

The first example of the present disclosure provides a file packing and unpacking method (applied to but is not limited to a Flash file). The method may be applied in discrete file packing and unpacking processes. The term "discrete" means that the unpacking of each file is independent. FIG. 2 and FIG. 3 respectively show a file packing process and a file unpacking process. As shown in FIG. 2, a main principle of the file packing process is as follows. A packing apparatus encrypts a target file (i.e., TargetFile needs to be packed) using an encryption/decryption algorithm (Alg) to obtain an encrypted target file (i.e., CipherFile). The packing apparatus divides the encryption/decryption algorithm into a first part encryption/decryption algorithm (AlgB) and a second part encryption/decryption algorithm (AlgA), and obtains a packed target file using the first part encryption/decryption algorithm (AlgB) and the encrypted target file (CipherFile). As shown in FIG. 3, a main principle of the file unpacking process is as follows. An unpacking apparatus receives a packed target file (ShellFile) and the second part encryption/decryption algorithm (AlgA) transmitted by the packing apparatus, obtains the first packet encryption/decryption algorithm (AlgB) and the encrypted target file (CipherFile) from the packed target file (ShellFile). Then, the unpacking apparatus obtains the encryption/decryption algorithm according to the first part encryption/decryption algorithm (AlgB) and the second part encryption/decryption algorithm (AlgA). The unpacking apparatus decrypts the encrypted target file (CipherFile) using the encryption/decryption algorithm (Alg) to obtain the target file (TargetFile).

Figure 4:
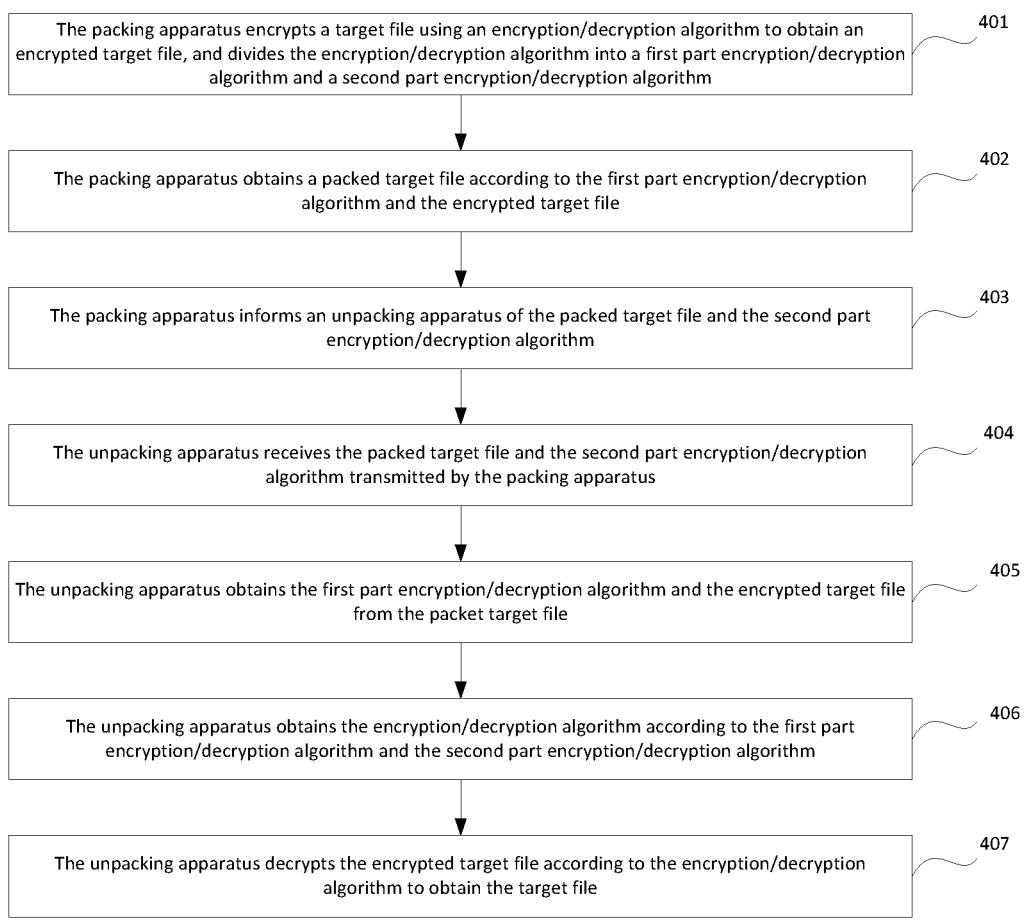
FIG. 4 is a flowchart illustrating a file packing and unpacking method according to the first example of the present disclosure.

Based on the principles shown in FIG. 2 and FIG. 3, a file packing and unpacking method is shown in FIG. 4. As shown in FIG. 4, the method includes the following.

At block 401, a packing apparatus (e.g., a developing machine, a compiling machine, etc.) encrypts a target file (i.e., TargetFile needs to be packed) using an encryption/decryption algorithm (Alg) to obtain an encrypted target file (CipherFile), and divides the encryption/decryption algorithm into a first part encryption/decryption algorithm (AlgB) and a second part encryption/decryption algorithm (AlgA), wherein the first part encryption/decryption algorithm (AlgB) carries an algorithm Key (secrete key) required by the encryption/decryption algorithm.

In the example of the present disclosure, the dividing of the encryption/decryption algorithm (Alg) into the first part (AlgB) and the second part (AlgA) includes: the packing apparatus dividing a file corresponding to the encryption/decryption algorithm (Alg) into two parts, AlgA and AlgB.

At block 402, the packing apparatus obtains a packed target file (ShellFile, i.e., a file finally generated by the packing process) using the first part encryption/decryption algorithm (AlgB) and the encrypted target file (CipherFile).

The packing apparatus may embed the first part encryption/decryption algorithm (AlgB) into an algorithm area (i.e., AlgB field) of a packing template file (ShellTemplate, i.e., a template used for file packing), and embeds the encrypted target file (CipherFile) into a data area (i.e., Data field) of the packing template file (ShellTemplate), so as to obtain the packed target file (ShellFile) through the packing template file (ShellTemplate).

In the example of the present disclosure, after the first part encryption/decryption algorithm (AlgB) and the encrypted target file (CipherFile) are embedded into the packing template file (ShellTemplate) whose algorithm area (AlgB field) and data area (Data field) are empty, the packed target file (ShellFile) is generated.

In one example, the packing template file (ShellTemplate) may further include a target file type area (i.e., Type field). Thus, when generating the packed target file (ShellFile), the packing apparatus may further obtain a file type of the target file (TargetFile) and embed the file type of the target file (TargetFile) into the target file type area (Type field) of the packing template file (ShellTemplate).

At block 403, the packing apparatus informs an unpacking apparatus (e.g., a client device, etc.) of the packed target file (ShellFile) and the second part encryption/decryption algorithm (AlgA). After obtaining the packed target file (ShellFile), the packing apparatus transmits the packed target file (ShellFile) to a server and the server transmits the packed target file (ShellFile) to the unpacking apparatus.

In the example of the present disclosure, the packed target file (ShellFile) and the second part encryption/decryption algorithm (AlgA) may be informed together or respectively by the packing apparatus.

It should be noted that, when informing the unpacking apparatus of the second part encryption/decryption algorithm (AlgA), the packing apparatus uses an algorithm library (AlgLib) manner. The algorithm library (AlgLib) stores a corresponding relationship between AlgB_MD5 and AlgA of each of several encryption/decryption algorithms, wherein AlgB_MD5 is an MD5 value of AlgB of the encryption/decryption algorithm, AlgA is the AlgA of the encryption/decryption algorithm.

The packing apparatus needs to obtain the MD5 value (i.e., AlgB_MD5) corresponding to the first part encryption/decryption algorithm (AlgB) and record a corresponding relationship between the MD5 value (AlgB_MD5) corresponding to the first part encryption/decryption algorithm and the second part encryption/decryption algorithm (AlgA) in the algorithm library (AlgLib). Then, the packing apparatus informs the unpacking apparatus of the algorithm library (AlgLib).

Based on the above file packing operation, the method of the present disclosure as shown in FIG. 4 may further include a following file unpacking process.

At block 404, the unpacking apparatus receives the packed target file (ShellFile) and the second part encryption/decryption algorithm (AlgA) transmitted by the packing apparatus.

It should be noted that, when receiving the packed target file (ShellFile) and the second part encryption/decryption algorithm (AlgA) transmitted by the packing apparatus, the unpacking apparatus receives the second part encryption/decryption algorithm (AlgA) in form of receiving the algorithm library (AlgLib) transmitted by the packing apparatus. The algorithm library (AlgLib) stores the corresponding relationship between MD5 value (AlgB_MD5) corresponding the first part encryption/decryption algorithm (AlgB) and second part encryption/decryption algorithm (AlgA) of each of several encryption/decryption algorithms.

At block 405, the unpacking apparatus obtains the first part encryption/decryption algorithm (AlgB) and the encrypted target file (CipherFile) from the packed target file (ShellFile).

Since the packing template file (ShellTemplate) of the packed target file (ShellFile) is embedded with the first part encryption/decryption algorithm (AlgB) and the encrypted target file (CipherFile), the unpacking apparatus may obtain the embedded first part encryption/decryption algorithm (AlgB) from the algorithm field (AlgB field) of the packing template file (ShellTemplate) of the packed target file (ShellFile), and obtains the embedded encrypted target file (CipherFile) from the data area (Data field) of the packing template file (ShellTemplate) of the packed target file (ShellFile).

In one example, if the file type of the target file (TargetFile) is embedded in packed target file (ShellFile), the unpacking apparatus may further obtain the embedded file type of the target file (TargetFile) from the target file type area (Type field) of the packing template file (ShellTemplate) of the packed target file (ShellFile).

At block 406, the unpacking apparatus obtains the encryption/decryption algorithm according to the first part encryption/decryption algorithm (AlgB) and the second part encryption/decryption algorithm (AlgA).

After obtaining the first part encryption/decryption algorithm (AlgB) from the packed target file (ShellFile), the unpacking apparatus obtains the MD5 value (AlgB_MD5) corresponding to the first part encryption/decryption algorithm (AlgB) and inquires the algorithm library (AlgLib) according to the MD5 value (AlgB_MD5) corresponding to the first part encryption/decryption algorithm. Since the algorithm library stores corresponding relationships between MD5 values (i.e., AlgB_MD5) of the first part encryption/decryption algorithms (AlgB) and the second part encryption/decryption algorithms (AlgA) of several encryption/decryption algorithms, the corresponding second part encryption/decryption algorithm (AlgA) may be obtained. Then, the unpacking apparatus combines the first part encryption/decryption algorithm (AlgB) and the second part encryption/decryption algorithm (AlgA) to obtain the encryption/decryption algorithm (Alg).

At block 407, the unpacking apparatus decrypts the encrypted target file (CipherFile) using the encryption/decryption algorithm (Alg) to obtain the target file (TargetFile).

In the example of the present disclosure, through dividing the encryption/decryption algorithm and carrying merely a part of the encryption/decryption algorithm in the packed target file, the complete encryption/decryption algorithm is not easy to be found and cracked. Thus, the security level of the packing technique is increased.

It should be noted that, compared with conventional file encryption procedure in an existing file encryption system, in the file encryption system, the encryption/decryption algorithm is not divided into the first part encryption/decryption algorithm and the second part encryption/decryption algorithm. The processing to the file in the file encryption system cannot ensure the execution of the program. However, the above file packing and unpacking process is capable of ensuring the execution of the program.

A Second Example

Figure 5:
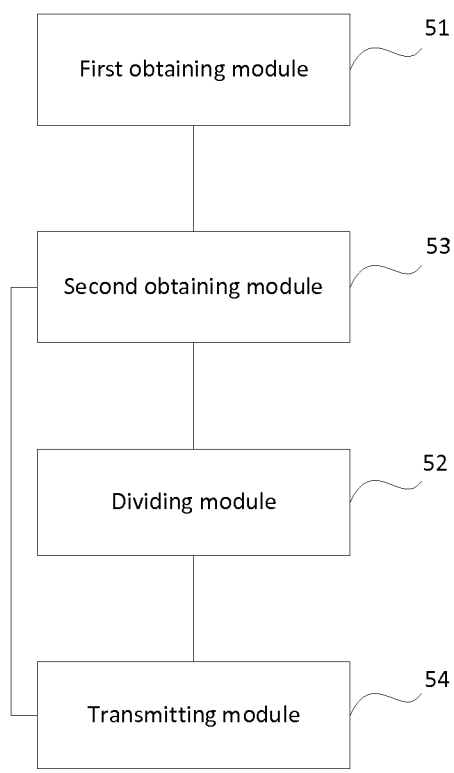
FIG. 5 is a schematic diagram illustrating a structure of a file packing apparatus according to a second example of the present disclosure.

Based on a similar idea of the above method example, an example of the present disclosure provides a packing apparatus, as shown in FIG. 5. The packing apparatus includes:

a first obtaining module 51, adapted to encrypt a target file using an encryption/decryption algorithm to obtain an encrypted target file;

a dividing module 52, adapted to divide the encryption/decryption algorithm into a first part encryption/decryption algorithm and a second part encryption/decryption algorithm;

a second obtaining module 53, adapted to obtain a packed target file according to the first part encryption/decryption algorithm and the encrypted target file; and a transmitting module 54, adapted to transmit the packed target file and the second part encryption/decryption algorithm to an unpacking apparatus.

The second obtaining module 53 is further adapted to embed the first part encryption/decryption algorithm into an algorithm area of a packing template file, embed the encrypted target file into a data area of the packing template file, so as to obtain the packed target file according to the packing template file.

The transmitting module 54 is further adapted to obtain an MD5 value corresponding to the first part encryption/decryption algorithm, record a corresponding relationship between the MD5 value of the first part encryption/decryption algorithm and the second part encryption/decryption algorithm in an algorithm library, and inform the unpacking apparatus of the algorithm library.

In examples of the present disclosure, the target file includes but is not limited to a Flash file.

A Third Example

Figure 6:
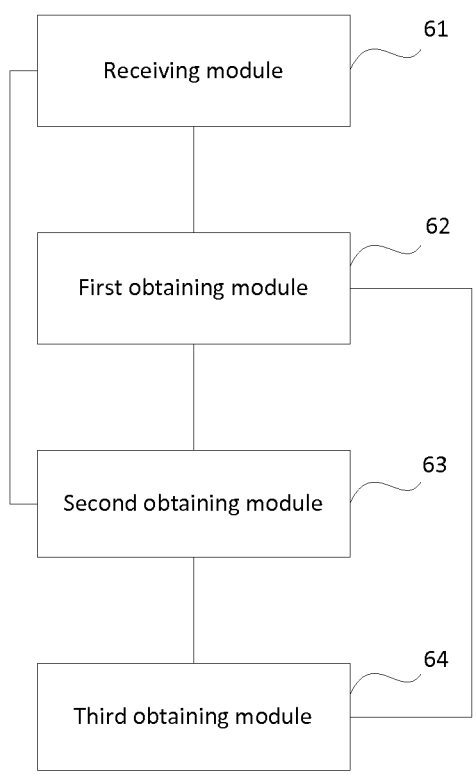
FIG. 6 is a schematic diagram illustrating a structure of a file unpacking apparatus according to a third example of the present disclosure.

Based on similar idea with the above method example, an example of the present disclosure provides an unpacking apparatus, as shown in FIG. 6. The unpacking apparatus includes:

a receiving module 61, adapted to receive a packed target file and a second party encryption/decryption algorithm transmitted by a packing apparatus;

a first obtaining module 62, adapted to obtain a first part encryption/decryption algorithm and an encrypted target file from the packed target file;

a second obtaining module 63, adapted to obtain an encryption/decryption algorithm according to the first part encryption/decryption algorithm and the second part encryption/decryption algorithm; and a third obtaining module 64, adapted to obtain a target file through decrypting the encrypted target file using the encryption/decryption algorithm.

The first obtaining module 62 is further adapted to obtain the first part encryption/decryption algorithm from an algorithm area of a packing template file of the packed target file, and obtain the encrypted target file from a data area of the packing template file.

The receiving module 61 is further adapted to receive an algorithm library transmitted by the packing apparatus, wherein the algorithm library records a corresponding relationship between an MD5 value of the first part encryption/decryption algorithm and the second part encryption/decryption algorithm.

The second obtaining module 63 is further adapted to
  obtain the MD5 value corresponding to the first part encryption/decryption algorithm,
  inquire the algorithm library according to the MD5 value corresponding to the first part encryption/decryption algorithm to obtain the second part encryption/decryption algorithm; and combine the first part encryption/decryption algorithm and the second part encryption/decryption algorithm to obtain the encryption/decryption algorithm.

In examples of the present disclosure, the target file includes but is not limited to a Flash file.

Through the above descriptions, those with ordinary skill in the art would know that the present disclosure may be implemented in form of software and a necessary hardware platform, or implemented by hardware. But the former is better in most cases. Base on this, the technical solution of the present disclosure or the contribution part may be embodied in form of software product stored on a storage medium. The software product includes a set of instructions executable by a computer (e.g., personal computer, server, or network device) to execute the methods described with reference to each example of the present disclosure.

The drawings merely show some schematic diagrams of examples, not all the modules or blocks in the drawings are necessary for implementing the present disclosure.

It is apparent for those with ordinary skill in the art that, the modules in the apparatus may be disposed in the apparatus according to the description of the examples, or may be disposed in one or more apparatuses after corresponding variation. The modules may be combined into one module or divided into multiple sub-modules.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A file packing method, comprising:
    encrypting a target file using an encryption/decryption algorithm to obtain an encrypted target file, dividing the encryption/decryption algorithm into a first part encryption/decryption algorithm and a second part encryption/decryption algorithm;
    obtaining a packed target file according to the first part encryption/decryption algorithm and the encrypted target file; and
    informing an unpacking apparatus of the packed target file and the second part encryption/decryption algorithm;
    wherein the informing the unpacking apparatus of the second part encryption/decryption algorithm comprises: obtaining an MD5 value corresponding to the first part encryption/decryption algorithm, recording a relationship between the MD5 value corresponding to the first part encryption/decryption algorithm and the second part encryption/decryption algorithm in an algorithm library; and informing the unpacking apparatus of the algorithm library.

2. The file packing apparatus of claim 1, wherein the obtaining the packed target file according to the first part encryption/decryption algorithm and the encrypted target file comprises:
    embedding the first part encryption/decryption algorithm into an algorithm area of a packing template file, embedding the encrypted target file into a data area of the packing template file, so as to obtain the packed target file through the packing template file.

3. The method of claim 1, wherein the file comprises a Flash file.

4. A file unpacking method, comprising:
    receiving a packed target file and a second part encryption/decryption algorithm transmitted by a packing apparatus;
    obtaining a first part encryption/decryption algorithm and an encrypted target file from the packed target file;
    obtaining an encryption/decryption algorithm according to the first part encryption/decryption algorithm and the second part encryption/decryption algorithm;
    decrypting the encrypted target file using the encryption/decryption algorithm to obtain a target file; and
    receiving an algorithm library wherein the algorithm library records a relationship between an MD5 value corresponding to the first part encryption/decryption algorithm and the second part encryption/decryption algorithm;
    wherein the obtaining the encryption/decryption algorithm according to the first part encryption/decryption algorithm and the second part encryption/decryption algorithm comprises: obtaining the MD5 value corresponding to the first part encryption/decryption algorithm, inquiring the algorithm library according to the MD5 value corresponding to the first part encryption/decryption algorithm to obtain the second part encryption/decryption algorithm; and combining the first part encryption/decryption algorithm and the second part encryption/decryption algorithm to obtain the encryption/decryption algorithm.

5. The file unpacking method of claim 4, wherein the obtaining the first part encryption/decryption algorithm and the encrypted target file from the packed target file comprises:
    obtaining the first part encryption/decryption algorithm from an algorithm area of a packing template file of the packed target file, and obtaining the encrypted target file from a data area of the packing template file.

6. The file unpacking method of claim 4, wherein the file comprises a Flash file.

7. A packing apparatus, comprising:
    a first obtaining module, adapted to encrypt a target file using an encryption/decryption algorithm to obtain an encrypted target file;
    a dividing module, adapted to divide the encryption/decryption algorithm into a first part encryption/decryption algorithm and a second part encryption/decryption algorithm;
    a second obtaining module, adapted to obtain a packed target file according to the first part encryption/decryption algorithm and the encrypted target file; and
    a transmitting module, adapted to transmit the packed target file and the second part encryption/decryption algorithm to an unpacking apparatus;
    wherein the transmitting module is further adapted to obtain an MD5 value corresponding to the first part encryption/decryption algorithm, record a corresponding relationship between the MD5 value of the first part encryption/decryption algorithm and the second part encryption/decryption algorithm in an algorithm library, and inform the unpacking apparatus of the algorithm library.

8. The packing apparatus of claim 7, wherein the second obtaining module is further adapted to embed the first part encryption/decryption algorithm into an algorithm area of a packing template file, embed the encrypted target file into a data area of the packing template file, so as to obtain the packed target file according to the packing template file.

9. The file packing apparatus of claim 7, wherein the file comprises a Flash file.

10. An unpacking apparatus, comprising:
a receiving module, adapted to receive a packed target file and a second party encryption/decryption algorithm library transmitted by a packing apparatus;
a first obtaining module, adapted to obtain a first part encryption/decryption algorithm and an encrypted target file from the packed target file;
a second obtaining module, adapted to obtain an encryption/decryption algorithm according to the first part encryption/decryption algorithm and the second part encryption/decryption algorithm; and
a third obtaining module, adapted to obtain a target file through decrypting the encrypted target file using the encryption/decryption algorithm;
wherein the receiving module is further adapted to receive an algorithm library transmitted by the packing apparatus, where the algorithm library records a corresponding relationship between an MD5 value of the first part encryption/decryption algorithm and the second part encryption/decryption algorithm;
wherein the second obtaining module is further adapted to obtain the MD5 value corresponding to the first part encryption/decryption algorithm, inquire the algorithm library according to the MD5 value corresponding to the first part encryption/decryption algorithm to obtain the second part encryption/decryption algorithm; and combine the first part encryption/decryption algorithm and the second part encryption/decryption algorithm to obtain the encryption/decryption algorithm.

11. The unpacking apparatus of claim 10, wherein the first obtaining module is further adapted to obtain the first part encryption/decryption algorithm from an algorithm area of a packing template file of the packed target file, and obtain the encrypted target file from a data area of the packing template file.

12. The unpacking apparatus of claim 10, wherein the file comprises a Flash file.

\* \* \* \* \*